(12) United States Patent
Caulier

(10) Patent No.: US 7,908,969 B2
(45) Date of Patent: Mar. 22, 2011

(54) SAFETY SYSTEM AND A CORRESPONDING PRINTING PRESS

(75) Inventor: Yves Caulier, Montataire (FR)

(73) Assignee: Goss International Montataire SA, Montataire (FR)

( * ) Notice: Subject to any disclaimer, the term of this patent is extended or adjusted under 35 U.S.C. 154(b) by 540 days.

(21) Appl. No.: 11/402,711

(22) Filed: Apr. 12, 2006

(65) Prior Publication Data

US 2006/0231746 A1 Oct. 19, 2006

(30) Foreign Application Priority Data

Apr. 15, 2005 (FR) ..................................... 05 03802

(51) Int. Cl.
*B41F 1/34* (2006.01)
*B41F 33/00* (2006.01)
*G03B 1/56* (2006.01)
(52) U.S. Cl. ............. 101/480; 101/484; 226/91; 226/92
(58) Field of Classification Search .................... 29/709; 101/480, 484; 250/221; 340/509; 382/103, 382/152, 165; 226/91, 92
See application file for complete search history.

(56) References Cited

U.S. PATENT DOCUMENTS

| | | | | |
|---|---|---|---|---|
| 5,064,337 A * | 11/1991 | Asakawa et al. | ............... | 414/639 |
| 5,081,406 A * | 1/1992 | Hughes et al. | ................ | 318/478 |
| 5,142,152 A * | 8/1992 | Boiucaner | .................. | 250/341.7 |
| 5,280,622 A | 1/1994 | Tino | ............... | 700/255 |
| 6,366,220 B1 * | 4/2002 | Elliott | ............................ | 340/928 |
| 6,598,528 B2 | 7/2003 | Nakano et al. | ................ | 101/484 |
| 6,612,234 B2 * | 9/2003 | Hess | .............................. | 101/216 |
| 6,778,092 B2 * | 8/2004 | Braune | ......................... | 340/679 |
| 2001/0041077 A1 * | 11/2001 | Lehner et al. | ................ | 396/661 |
| 2001/0042462 A1 | 11/2001 | Takeaki et al. | ............... | 101/216 |
| 2002/0190191 A1 * | 12/2002 | Maurin et al. | ............. | 250/208.4 |
| 2003/0007473 A1 * | 1/2003 | Strong et al. | .................. | 370/338 |
| 2003/0053153 A1 * | 3/2003 | Morisaki | ....................... | 358/498 |
| 2003/0071162 A1 * | 4/2003 | Moser | ........................... | 242/559 |
| 2003/0121709 A1 * | 7/2003 | Lyshaug | ....................... | 180/271 |
| 2003/0233954 A1 * | 12/2003 | Frank et al. | .................... | 101/232 |
| 2004/0028190 A1 * | 2/2004 | Golden | ........................... | 379/37 |
| 2004/0251589 A1 * | 12/2004 | Satoh et al. | ................. | 271/10.01 |
| 2005/0073437 A1 * | 4/2005 | Perri | ............................. | 340/944 |
| 2005/0128060 A1 * | 6/2005 | Rennick et al. | ............... | 340/435 |
| 2007/0285222 A1 * | 12/2007 | Zadnikar | ....................... | 340/509 |

FOREIGN PATENT DOCUMENTS

| | | |
|---|---|---|
| DE | 39 19 167 C1 | 9/1990 |
| DE | 100 26 711 A1 | 12/2001 |
| EP | 1155849 | 11/2001 |
| JP | 09 174820 | 7/1997 |
| JP | 2001226060 A * | 8/2001 |

* cited by examiner

*Primary Examiner* — Judy Nguyen
*Assistant Examiner* — David Banh
(74) *Attorney, Agent, or Firm* — Davidson, Davidson & Kappel, LLC

(57) ABSTRACT

The present invention relates to a safety system comprising at least two stationary detector elements each defining a respective first safety zone, said first safety zones not coinciding, a moving detector element, and a control unit connected to the stationary detector elements. The control unit is adapted to detect the presence of the moving detector element in one of the first safety zones. The invention is applicable to rotary printing presses.

7 Claims, 2 Drawing Sheets

SAFETY SYSTEM AND A CORRESPONDING PRINTING PRESS

The present invention relates to a safety system of the type comprising at least two stationary detector elements, each defining a respective first safety zone, the first safety zones not coinciding.

BACKGROUND OF THE INVENTION

U.S. Pat. No. 6,598,528 discloses a rotary printing press provided with a safety system. The safety system has a plurality of light-emitter units and a plurality of associated light-receiver units. These units create a light curtain which is used to check whether a human being enters into the space situated between the print unit during the operation of automatically changing plates.

Rotary printing presses are also known that are provided with respective devices for engaging the strip of paper in the press, enabling the strip to be engaged automatically between the cylinders of the print units.

Nevertheless, in such presses, when initiating strip engagement, in order to avoid accidents it is necessary to verify manually whether the path for the strip is free and that nobody is on that path.

OBJECTS AND SUMMARY OF THE INVENTION

An object of the present invention is to increase the safety of a rotary press, and to do with means that are simple and inexpensive.

To this end, the invention provides a safety system of the above-specified type, comprising:

a moving detector element adapted to co-operate with the two stationary detector elements; and a control unit connected at least to the stationary detector elements and adapted to detect the presence of the moving detector element in one of the first safety zones.

In particular embodiments, the invention further comprises the following characteristics:

the safety system further comprises a presence sensor adapted to detect the presence of an object, in particular a human being, in a second safety zone;

the presence sensor is constrained to move with the moving detector element;

the presence sensor is stationary relative to the stationary detector element, and the second safety zone overlaps one of the first safety zones, at least in part;

the safety system further comprises a warning device, and the control system is adapted to trigger the warning device when the moving detector element enters into at least one of the first safety zones;

the warning device comprises audible and/or light-emitting warning members, and a warning member is associated with each first safety zone;

the control unit is adapted to trigger the presence sensor when the moving detector element enters into one of the first safety zones and is adapted to verify the presence of an object in the second safety zone on entering into the first safety zone; and the moving detector element is movable along a predetermined path, and the stationary detector elements are disposed along the predetermined path in such a manner that the moving detector member is adapted to pass through the first safety zones.

The invention also provides a printing press of the type provided with at least two print units and an engagement device for engaging a print strip in the press, the engagement device being provided with a transport member for transporting the end of the strip through the press, the press being provided with a safety system as defined above, the moving detector element being secured to the transport member and the stationary detector elements being disposed along the path of the transport member in such a manner that the moving detector element passes in succession through the first safety zones during displacement along the path.

BRIEF DESCRIPTION OF THE DRAWING

The present invention can be better understood on reading the following description Given purely by way of example and made with reference to the accompanying drawings, in which.

MORE DETAILED DESCRIPTION

Figure 1:
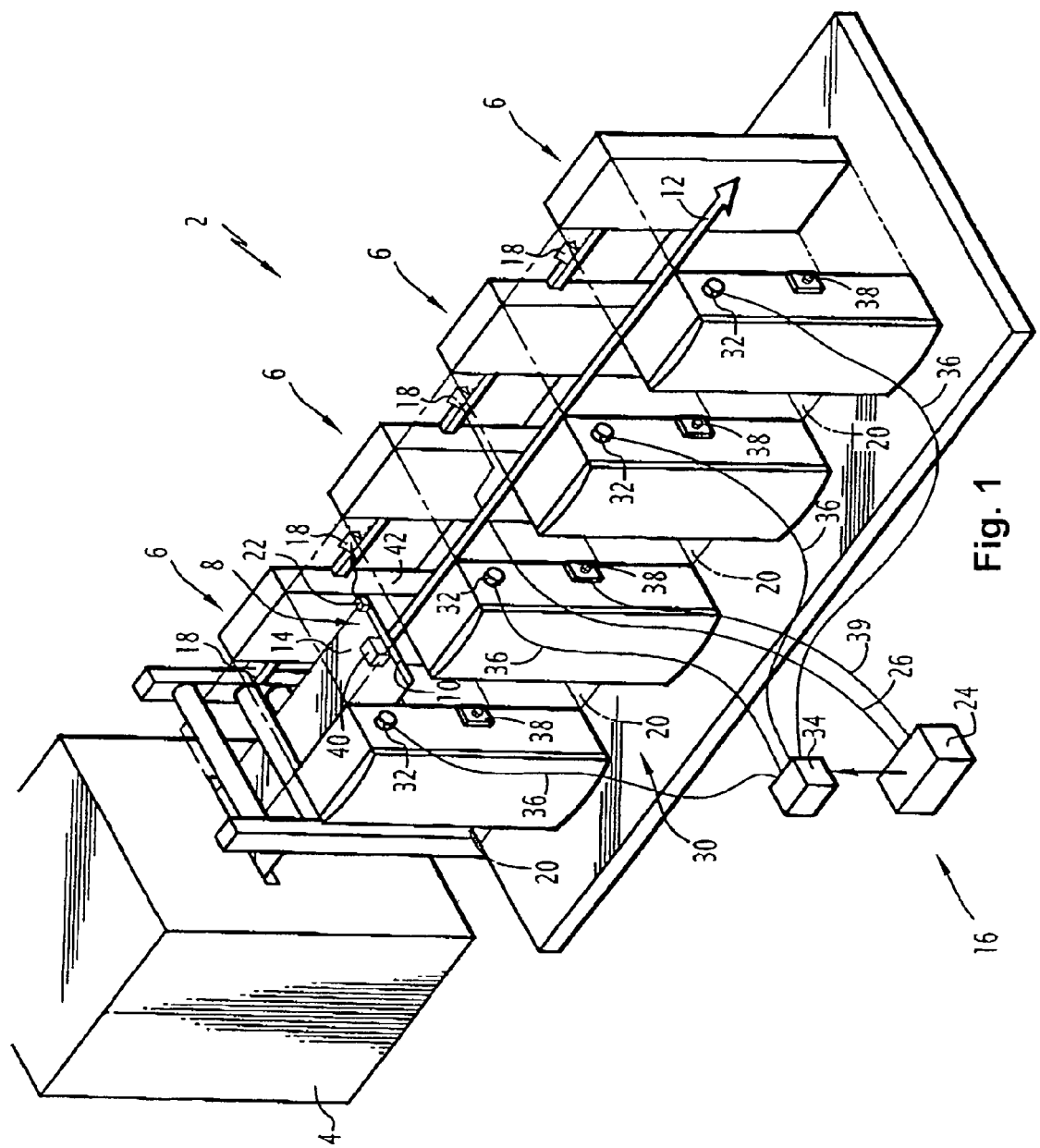
FIG. 1 shows an offset printing press to an embodiment of the present invention.

FIG. 1 shows an offset printing press of the invention given overall reference 2.

The printing press 2 comprises an inlet unit 4, four print units 6, and a strip engager device 8.

The inlet unit 4 is constituted, for example, by an unwinder for unwinding a strip of paper. Each print unit 6 includes at least one print cylinder.

The strip engager device 8 has a pull bar 10 that is adapted to be moved along an engagement path 12 so as to thread a strip of paper 14 for printing between the inlet unit 4 and the cylinders of the four print units 6.

The printing press 2 also includes a safety system 16 that is adapted to warn operators that the strip 14 or pull bar 10 is arriving in various zones of the engagement path 12.

For this purpose, the safety system 16 comprises four stationary detector elements 18, each defining a first three-dimensional safety zone 20 constituted in the present example by a volume behind each print unit 6 and through which there passes a fraction of the path 12. In FIG. 1, four detector elements are shown. This number of detector elements 18 varies depending on the number of zones 20 to be monitored. The safety zones 20 do not coincide, and in this particular example they do not overlap. In a variant, the safety zones 20 could overlap in part.

The safety system 16 is also provided with a moving detector element 22 that is secured to the pull bar 10.

The presence of the moving detector element 22 in the first safety zone 20 can be detected by the stationary detector element 18 associated with said zone 20. By way of example, the detector element 22 is a transmitter of the wireless type, while the detector elements 18 are receivers of the wireless type.

Finally, the safety system 16 is provided with a control unit 24 that is connected to the stationary detector elements 18 via signal links 26. By means of these signal links 26, the control unit 24 is adapted to detect the entry or the presence of the moving detector element 22 in each of the safety zones 20.

The safety system 16 is also provided with a warning device 30 which, for each stationary detector element 18, comprises an audible and/or light-emitting warning member 32 connected to a central unit 34 by a signal link 36. Each of the warning members 32 is associated with one of the first safety zones 20.

The control unit 24 is adapted to trigger the warning device 30 when the moving detector element 22 enters into one of the first safety zones 20. The unit 24 is also adapted to stop the corresponding warning device 30 when the moving detector element 22 moves out of one of the first safety zones 20.

In addition, for each stationary detector element 18, the warning device 30 includes a stop member 38 which is connected to the central unit 34 by a signal link 39.

The safety system 16 further comprises a presence sensor 40 which is secured to the pull bar 10. The presence sensor 40 is thus stationary relative to the moving detector element 22 and is adapted to detect the presence of an object, in particular a human being, in a second safety zone 42 that extends upstream from the pull bar 10. In the present example, the second safety zone 42 is identical to one of the first safety zones 18. The second safety zone 42 is likewise three-dimensional.

Figure 2:
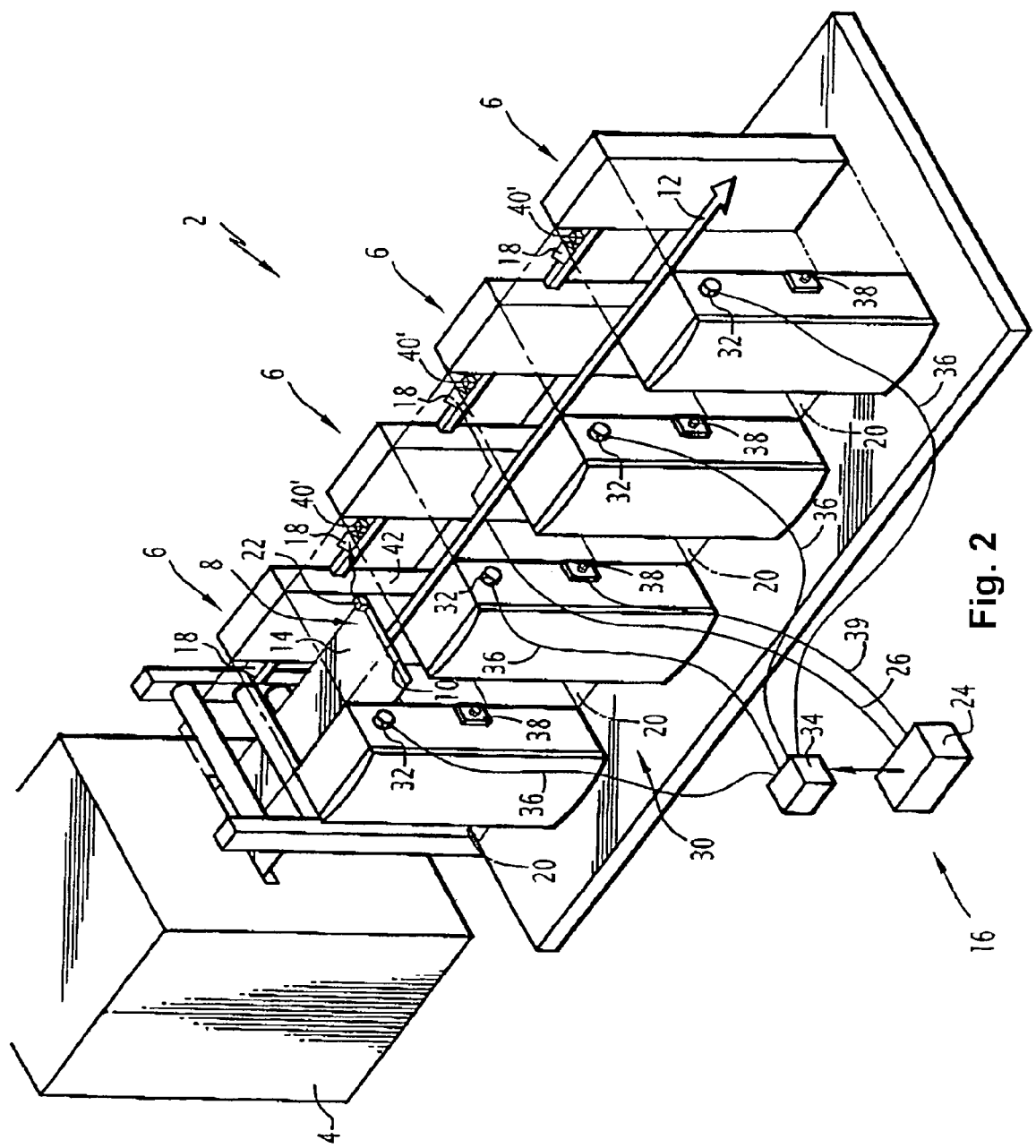
FIG. 2 show an offset printing press to an embodiment of the present invention.

In a variant, which is shown in FIG. 2, the presence sensor 40 is replaced by one or a plurality of stationary presence sensors 40' secured beside at least one of the stationary detector elements 18. Under such circumstances, the second safety zone 42 of the or each sensor 40' overlaps the first safety zone 20 of the corresponding stationary detector element 18. Four presence sensors 40' are shown in the FIG. 2. Each sensor 40' is associated with one of the elements 18.

The control unit 24 is adapted to trigger the presence sensor 40 when the moving detector element 22 enters one of the first safety zones 20 and is adapted to verify whether an object or a human being is present in the second safety zone 42 on entering the first safety zone 20.

The printing press 2 of the invention operates as follows.

In order to engage the strip of paper 14 in the printing press 2, the end of the strip 14 is secured to the pull bar 10, and the pull bar 10 moves along the path 12 successively through the inlet unit 4 and also through the four print units 6.

When the moving detector element 22 enters one of the first safety zones 20, the control unit 24 triggers the warning device 30, thus switching on the warning member 32 associated with said first 10 safety zone 20. Thereafter, if an operator is present in the first safety zone 20 into which the moving detector element 22 has just entered, the operator leaves the zone 20, or else actuates the member 38 in order to stop the pull bar 10. Actuating the stop member 38 causes a stop signal to be issued over the signal link 39. This signal is detected by the control unit 24 which stops the movement of the pull bar 10 along the path 12. The sequence for restarting the pull bar 10 is carried out from the control desk and/or a control board that are not shown in FIGS. 1 and 2. The pull bar 10 continues to move until the moving detector element 22 enters the following first safety zone 20.

On entering said following first safety zone 20, the warning member 32 associated with this first safety zone 20 is triggered if an operator is present in the zone, and the operator either leaves the zone or actuates the stop member 39.

This operation is repeated until the pull bar 10 has traveled all along the path 12.

When the moving detector element 22 enters into a first safety zone 20, the control unit 24 triggers the presence sensor 40 which verifies that no person or other object is present in the safety zone 20. If this verification is positive, i.e. if there is no obstacle in the zone 20, then the control unit 24 causes the pull bar 10 to continue along its path.

In a variant, a warning member 32 can be placed on the pull bar 10. Under such circumstances, only one warning member 32 is necessary for the safety system 16.

In the event of the presence of a human being being verified by the presence sensor 40, the warning members 32 and the validation members 38 can be omitted, thus further reducing the cost of the device.

The moving detector element 22 includes its own power supply that is independent of the control unit 24.

In another variant, the safety system 16 does not have a presence sensor 40.

What is claimed is:

1. A printing press comprising:
   at least two print units;
   an engagement device for engaging a print strip in the press, the engagement device comprising a transport member for transporting the end of the strip through the press; and
   a safety system including:
   at least two stationary detector elements each defining a respective first safety zone, the first safety zones not coinciding;
   a moving detector element adapted to co-operate with the two stationary detector elements, the moving detector element being movable along a predetermined path, the stationary detector elements being disposed along the predetermined path in such a manner that the moving detector element is adapted to pass through the first safety zones;
   a control unit connected at least to the stationary detector elements and adapted to detect the presence of the moving detector element in one of the first safety zones;
   wherein, when transporting the end of the print strip through the printing press, the predetermined path is a path of the transport member, the moving detector element is secured to the transport member and the stationary detector elements are disposed along the path of the transport member in such a manner that the moving detector element passes in succession through the first safety zones during displacement along the path; and
   a presence sensor adapted to detect the presence of an object in a second safety zone wherein the control unit is adapted to trigger the presence sensor when the moving detector element enters into one of the first safety zone and is adapted to verify the presence of an object upon the moving detector element entering the first safety zone.

2. The printing press according to claim 1, wherein the object is a human being.

3. The printing press according to claim 1, wherein the presence sensor is constrained to move with the moving detector element.

4. The printing press according to claim 1, wherein the presence sensor is stationary relative to the stationary detector element, and wherein the second safety zone overlaps one of the first safety zones, at least in part.

5. The printing press according to claim 1, further comprising a warning device, and wherein the control system is adapted to trigger the warning device upon the moving detector element entering the second safety zone.

6. The printing press according to claim 5, wherein the warning device comprises audible and/or light-emitting warning members, and wherein a warning member is associated with each first safety zone.

7. The printing press according to claim 1, wherein the at least two stationary detector elements are receptors of the wireless type and the moving detector element is an emitter of the wireless type.

* * * * *